United States Patent
Sanchez

[19]

[11] Patent Number: 5,427,458
[45] Date of Patent: Jun. 27, 1995

[54] SYSTEM FOR ELIMINATING FRICTION IN BEARINGS

[76] Inventor: Felix S. Sanchez, Escosura, 67-6° D, 50005 Zaragoza, Spain

[21] Appl. No.: 222,339

[22] Filed: Apr. 4, 1994

Related U.S. Application Data

[63] Continuation of Ser. No. 838,858, Feb. 21, 1992, abandoned.

[30] Foreign Application Priority Data

Jun. 5, 1991 [ES] Spain ................... 9101346

[51] Int. Cl.6 .................................... F16C 33/58
[52] U.S. Cl. .................... 384/516; 384/450; 384/565; 384/569
[58] Field of Search ............ 384/513, 514, 516, 569, 384/565, 568, 504, 445, 450, 456, 490, 492

[56] References Cited

U.S. PATENT DOCUMENTS

| | | | |
|---|---|---|---|
| 96,720 | 11/1869 | Parry | 384/450 |
| 1,310,423 | 7/1919 | Lippert-Bruenauer | 384/516 |
| 1,459,974 | 6/1923 | Critz, Jr. | |
| 1,510,920 | 10/1924 | Bronander | 384/565 |
| 1,862,641 | 6/1932 | Turner | 384/568 X |
| 1,930,118 | 10/1933 | Alderson | 384/565 X |
| 2,142,477 | 1/1939 | Murden | 384/516 |
| 2,232,159 | 2/1941 | Blood | 384/516 X |
| 2,316,449 | 4/1943 | Parker | 384/516 |
| 3,734,584 | 5/1973 | Studer | 384/565 |
| 4,629,340 | 12/1986 | Provost et al. | 384/450 X |
| 4,978,235 | 12/1990 | Jacob | 384/569 X |

FOREIGN PATENT DOCUMENTS

| | | | |
|---|---|---|---|
| 2076601 | 10/1971 | France . | |
| 935039 | 11/1955 | Germany . | |
| 1955045 | 5/1971 | Germany | 384/516 |
| 3-255216A | 11/1991 | Japan . | |
| 327413 | 3/1958 | Switzerland . | |
| 1849 | of 1906 | United Kingdom | 384/516 |
| 1625336 | 1/1991 | U.S.S.R. | 384/513 |

*Primary Examiner*—Thomas R. Hannon
*Attorney, Agent, or Firm*—Wigman, Cohen, Leitner & Myers

[57] ABSTRACT

A reduced friction bearing, includes an inner track or race, an outer track or race, a roller, and lines of contact provided in each of the inner and outer tracks. The ratio of the diameter of the inner track at the line of contact to the diameter of the roller at the location of each inner track line of contact is approximately equal to the ratio of the diameter of the outer track at the line of contact to the diameter of the roller at the location of each outer track line of contact. Various roller configurations and alignments are disclosed in the several embodiments of the invention.

20 Claims, 10 Drawing Sheets

SYSTEM FOR ELIMINATING FRICTION IN BEARINGS

This is a continuation of application Ser. No. 07/838,858, filed on Feb. 21, 1992, now abandoned.

BACKGROUND OF THE INVENTION

1. Field of the Invention

This invention relates to bearings generally and more particularly to a new system that eliminates the effect of friction that usually occurs in ball bearings, and in roller, conical, cylindrical, spherical and so-called tunnel bearings, with the exception of axial bearings.

2. Description of the Prior Art

As is known, a bearing, as its name indicates, is intended as a means of bearing, eliminating frictions, in order to achieve optimum working conditions in a machine or apparatus on which the bearing is mounted.

However, according to the present state of the art, it is true that ball bearings do not run but on the contrary produce from 30% to 50% friction because the rolling constants are unequal.

This is because the said friction arises due to the difference existing between the external or internal diameters or circumferences of their bearing or working tracks.

In some bearings this friction can reach more than 50%, causing high temperatures and consuming a great deal of energy, and also producing continuous wear that leads to the progressive shortening of the life of the bearing.

OBJECTS AND SUMMARY OF THE INVENTION

Therefore, an object of the invention is to increase the output of the bearing by substituting the points of contact between the same and its running tracks for contact lines, thus achieving important advantages over that already known, such as: Reduction of friction in the bearings to a desired minimum. Decrease of noise and heating. And a noticeable extension of two or three the life of the bearing since it is possible to reduce friction to a desired minimum.

BRIEF DESCRIPTION OF THE DRAWINGS

For great clarity and to aid in understanding the present invention reference is made to the drawings which illustrate an, example of how the object claimed may be practice, and which it cited and shown simply as an example and thus without any limitation implied wherein:

Brief Description of the Drawings

Figure 1:
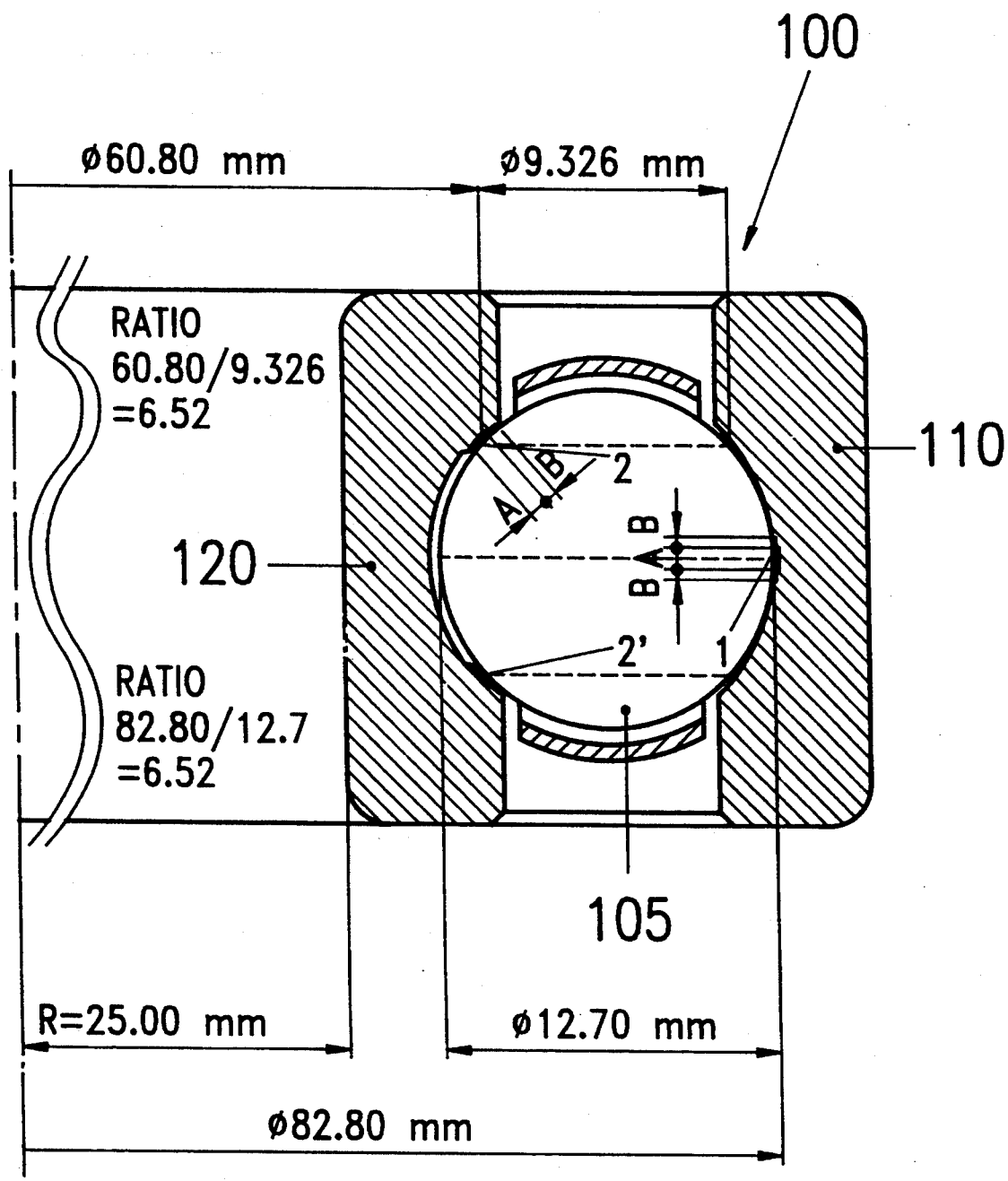
Figure 2A:
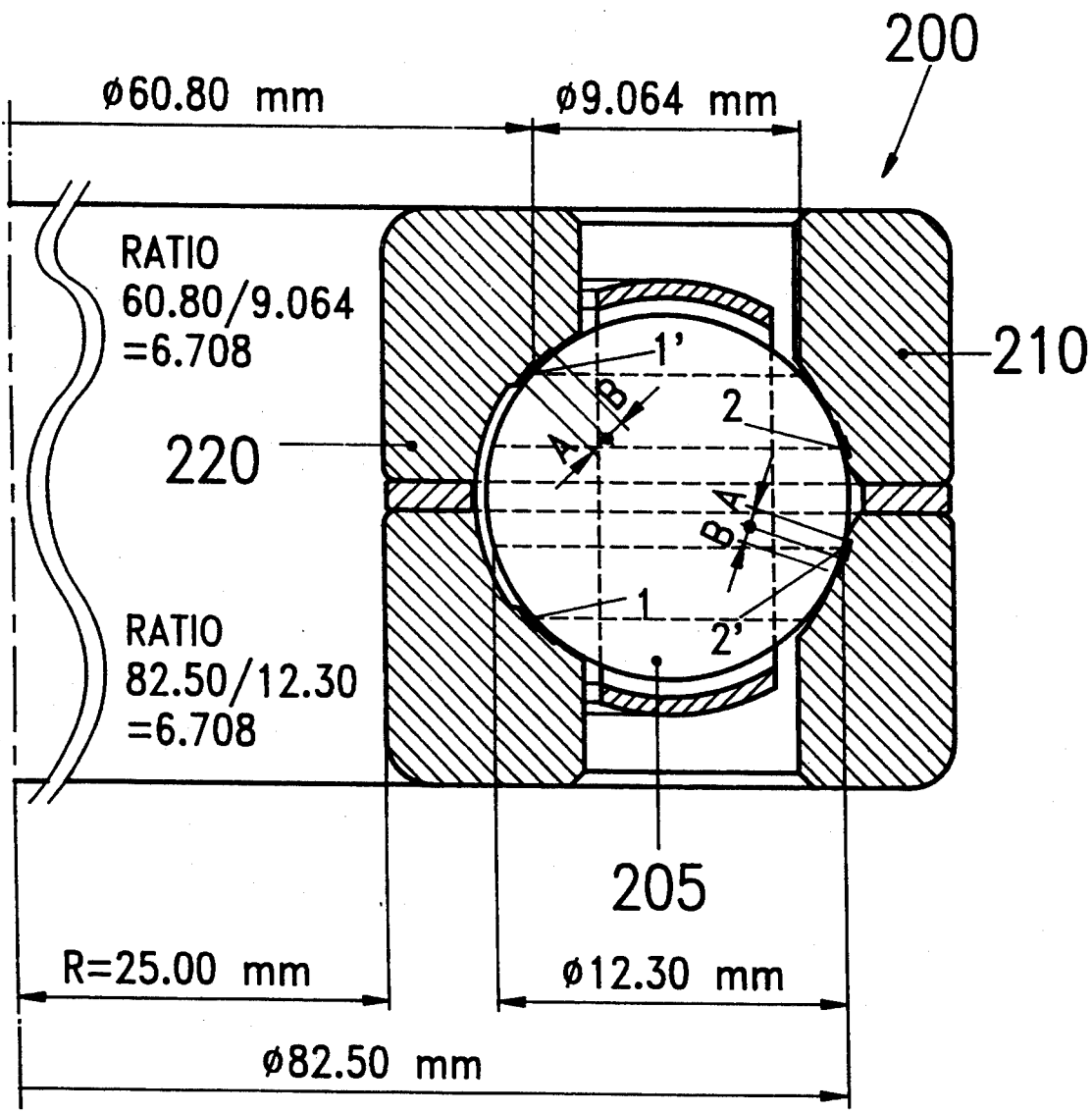
Figure 2B:
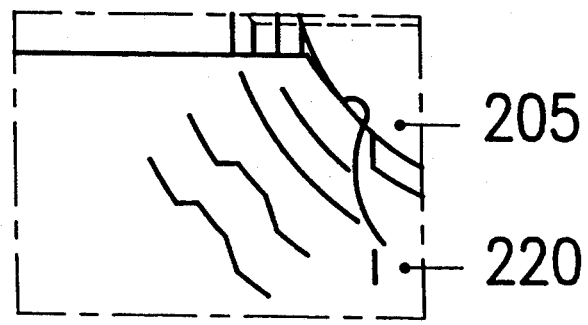
Figure 3A:
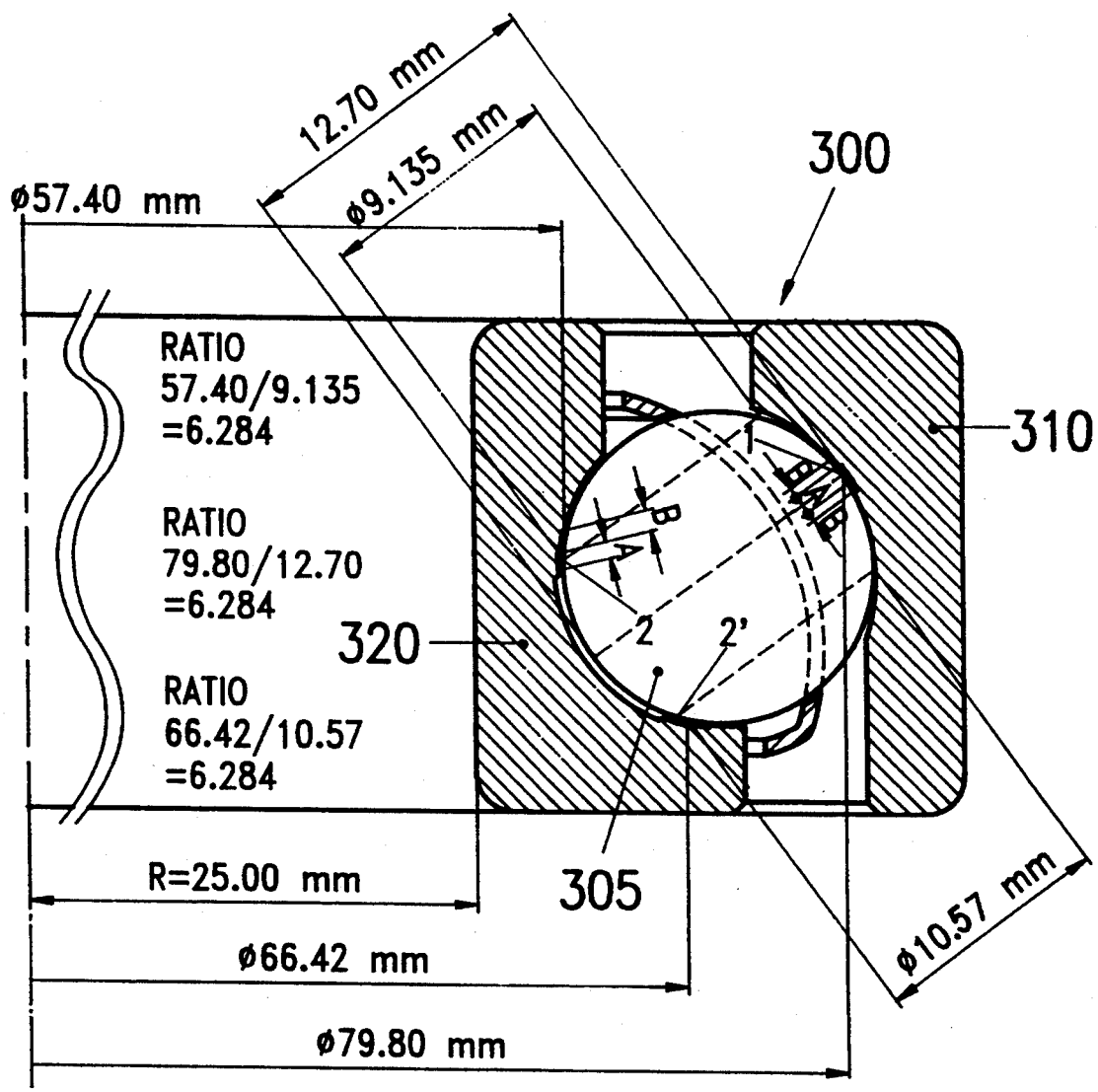
Figure 3B:
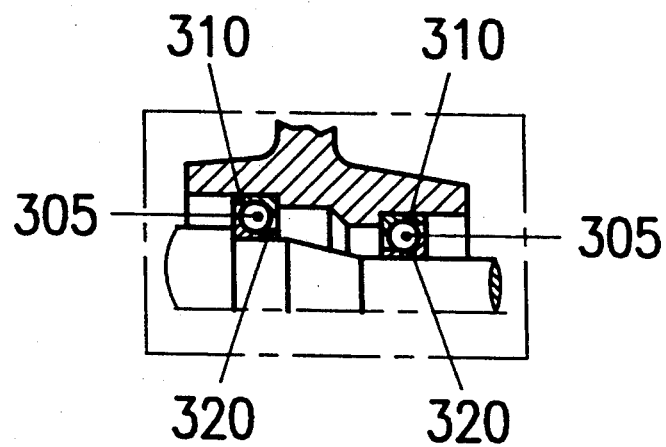
Figure 4:
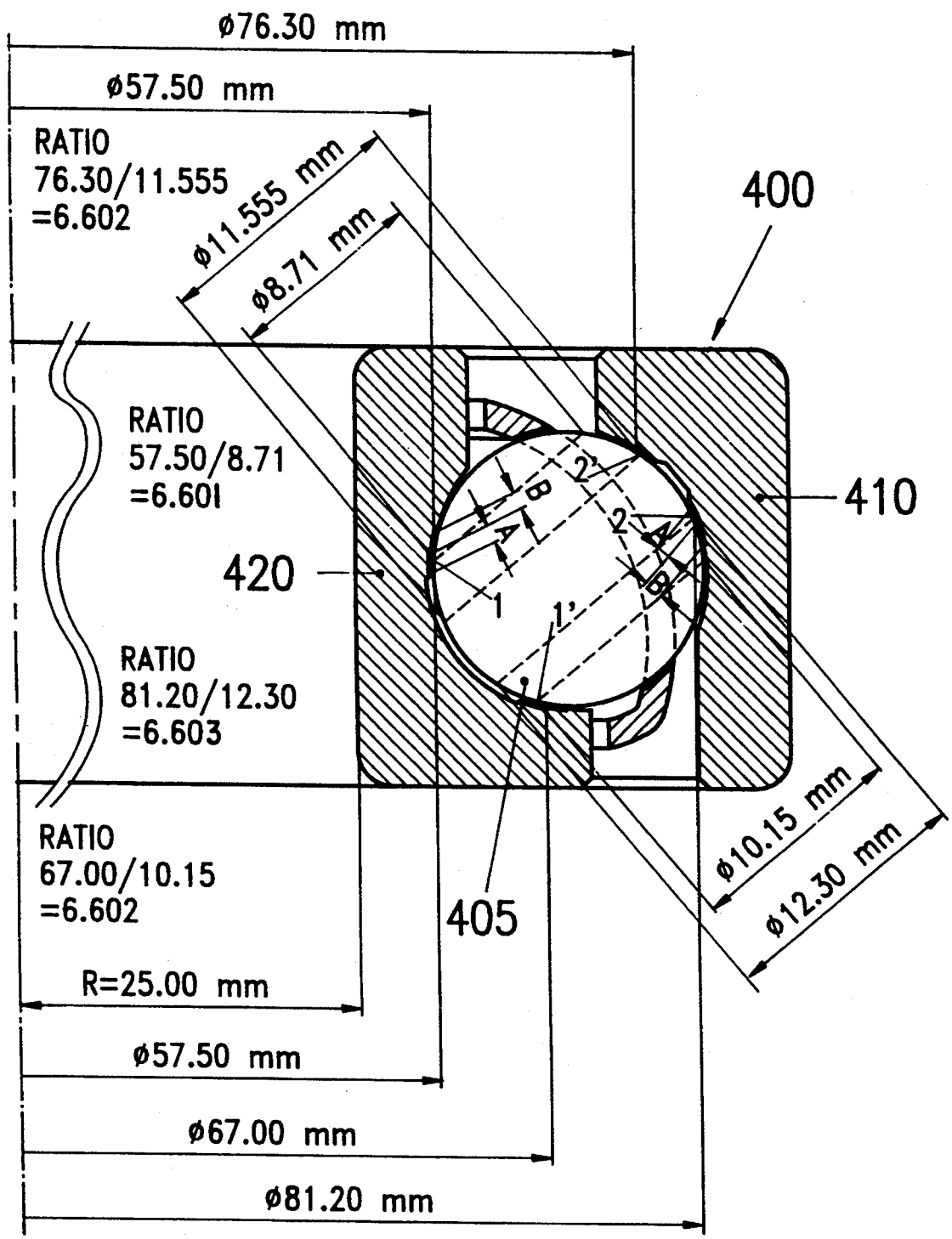
Figure 5:
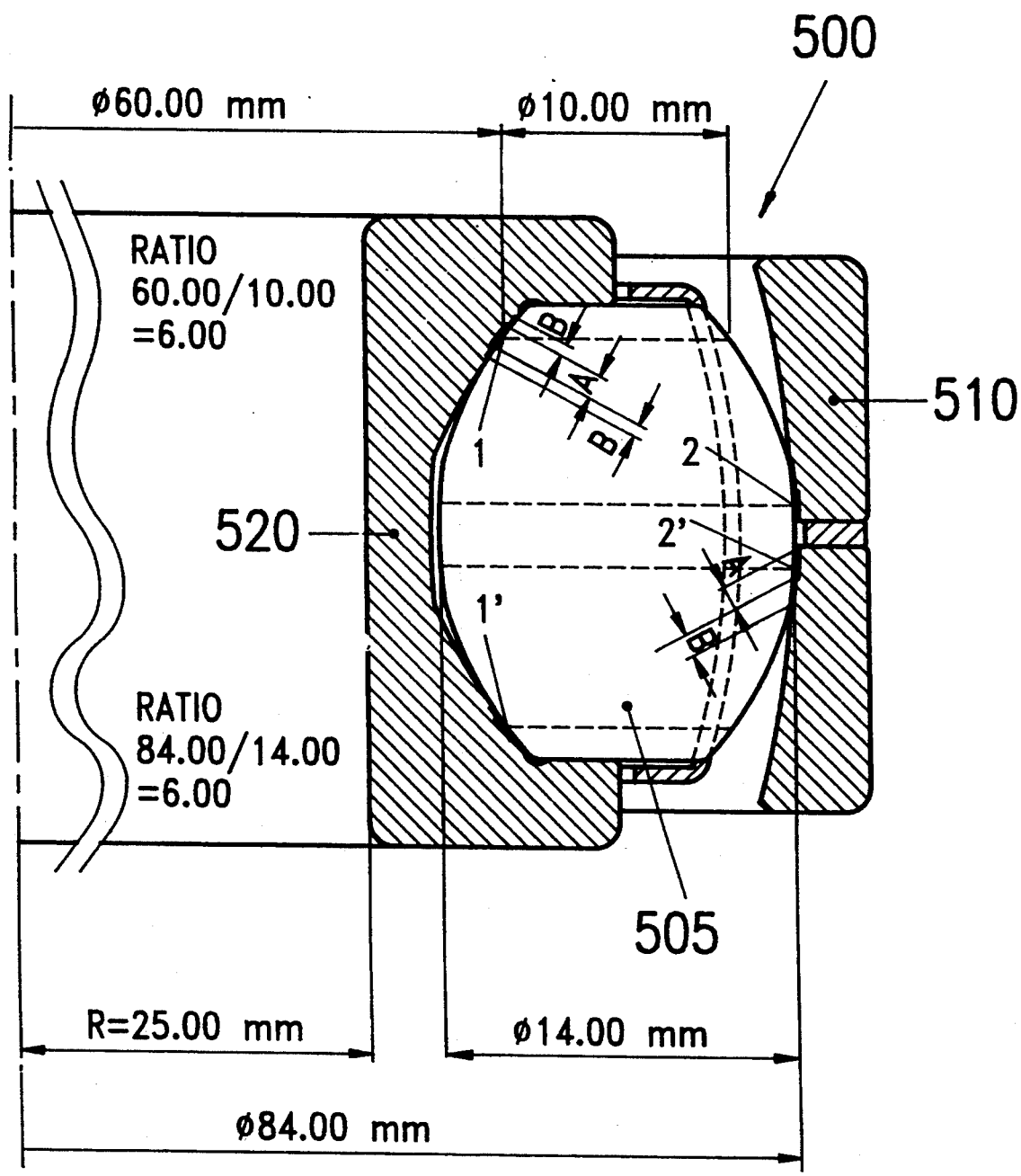
Figure 6A:
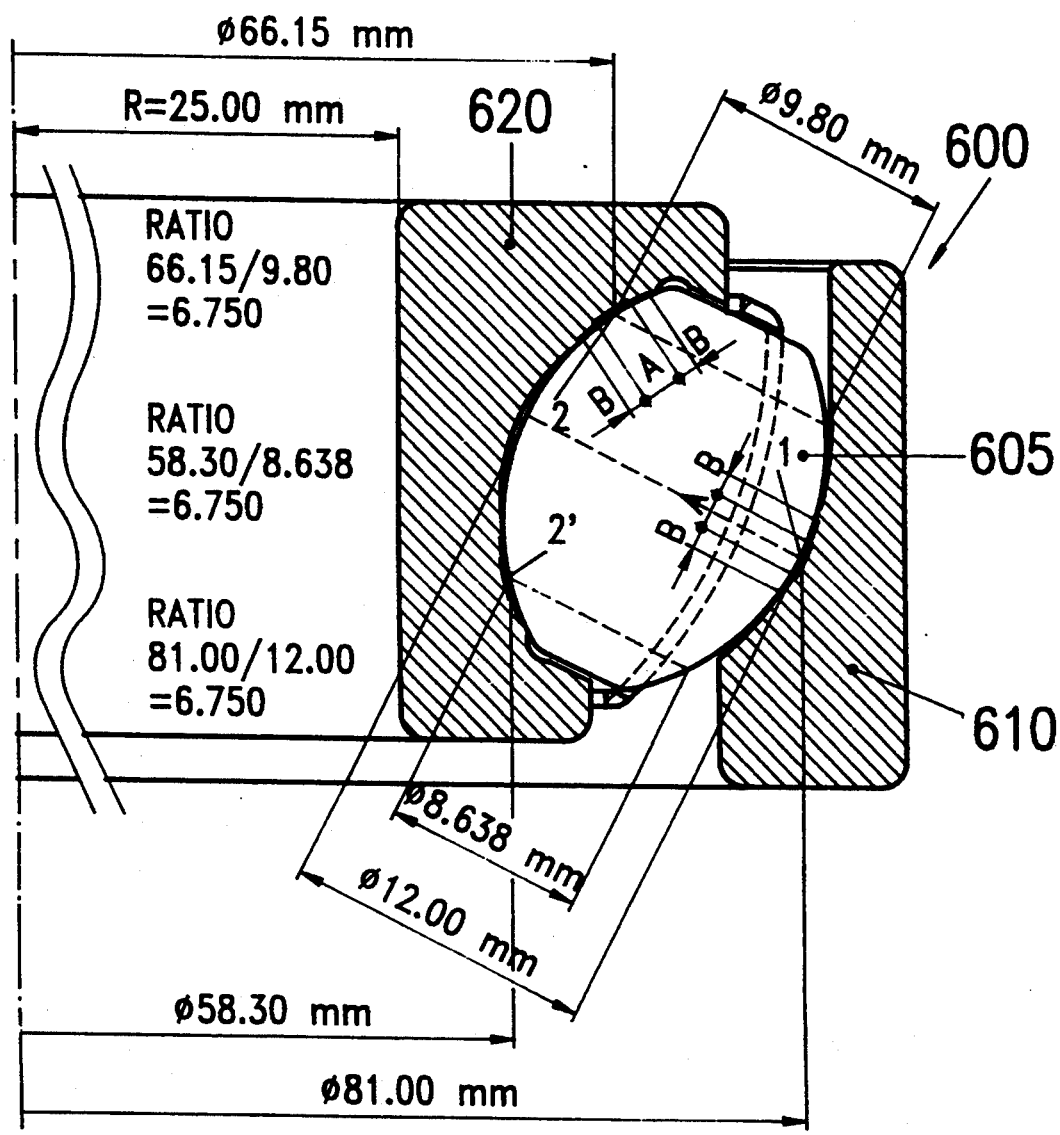
Figure 6B:
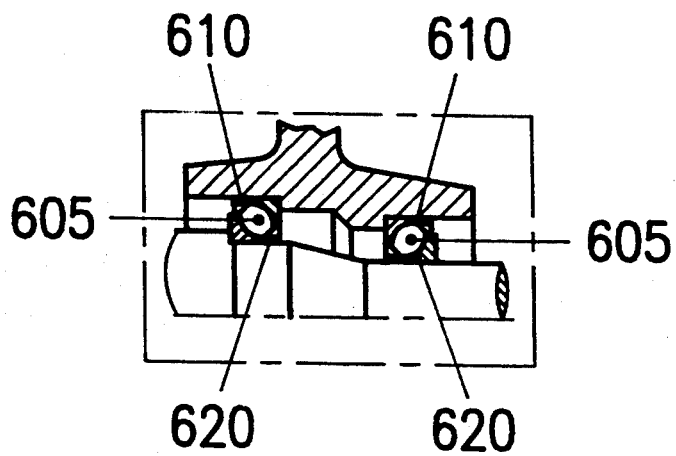
Figure 7:
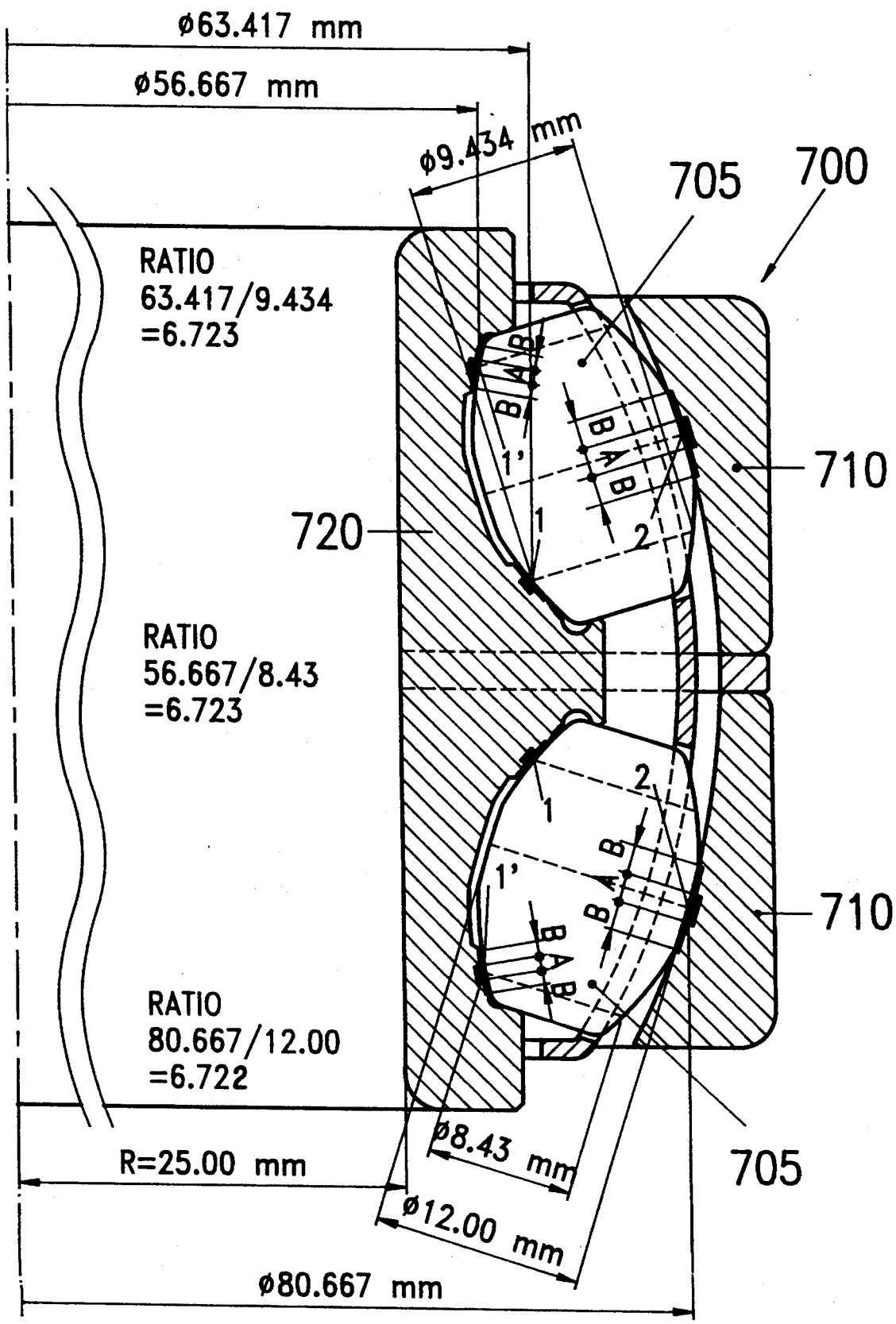
Figure 8A:
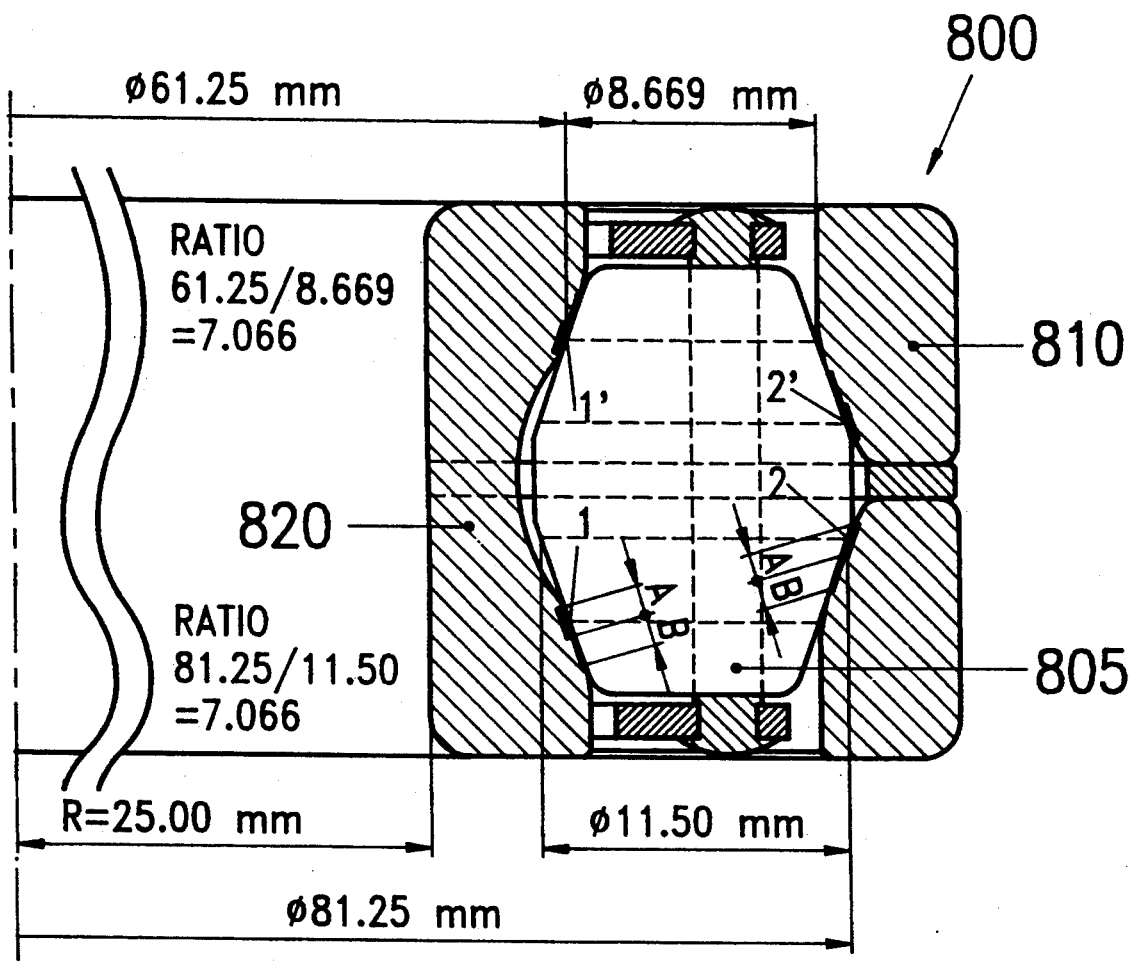
Figure 8B:
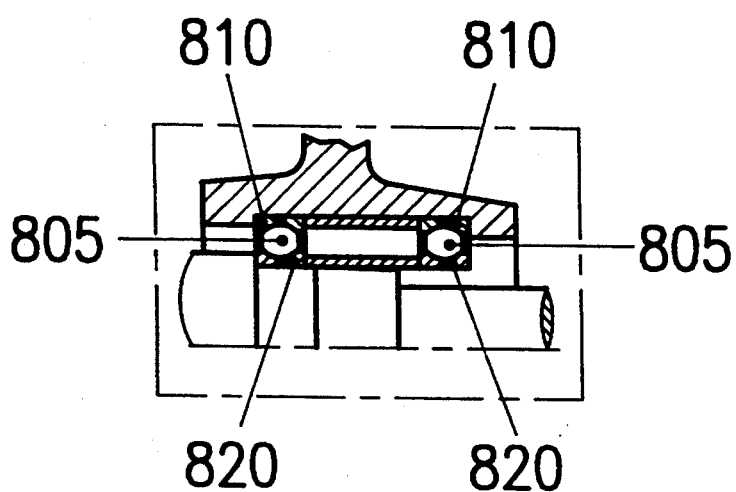
Figure 9A:
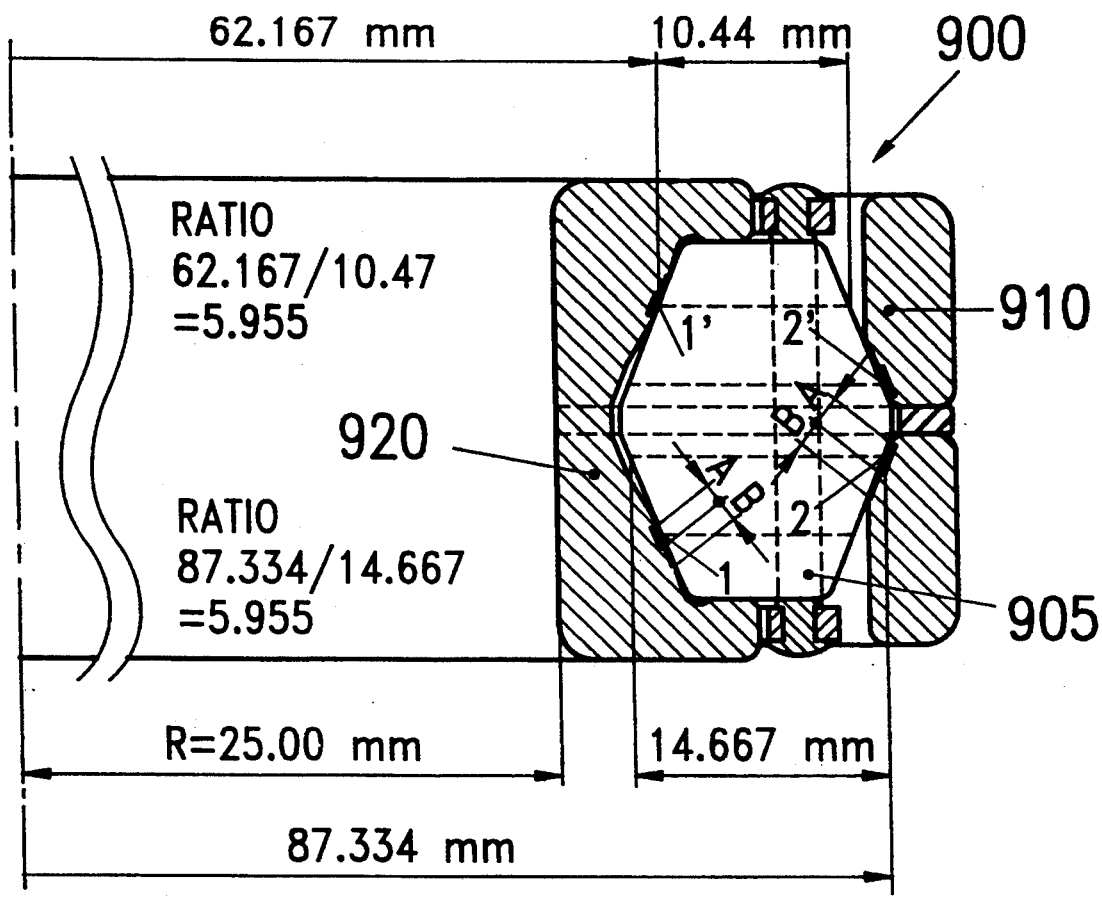
Figures 9B, 9C:
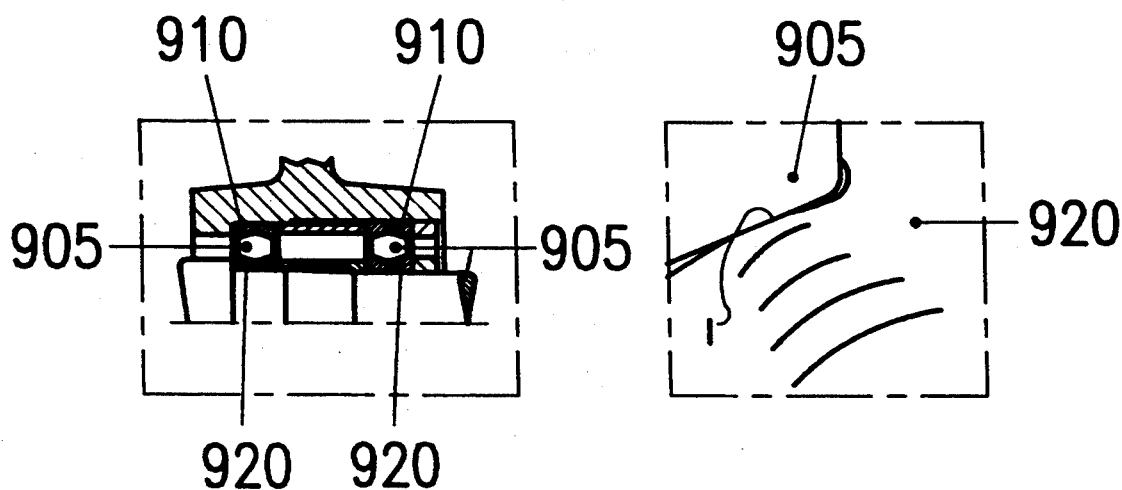
Figure 10A:
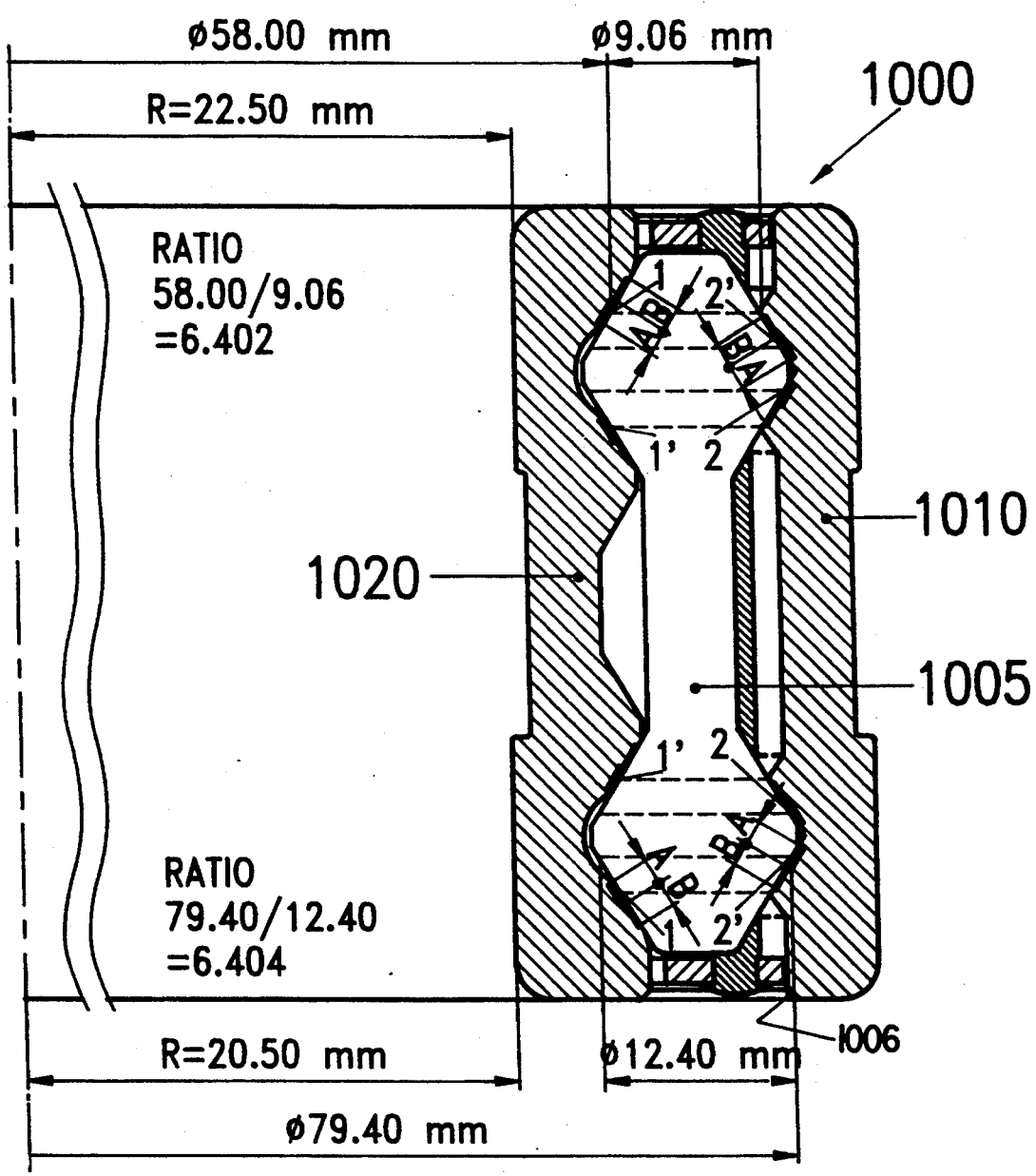

FIG. 1 is a sectional view of a ball bearing having three lines of contact;

FIG. 2a is a sectional view of a ball bearing having four contact lines according to the present invention;

FIG. 2b is a detail of a contact line for the ball bearing of FIG. 2a;

FIG. 3a is a first embodiment of a radial-axial ball bearing having unequal contact angles;

FIG. 3b is a detail showing the mounting of two radial axial-bearings, as in FIG. 3a;

FIG. 4 is a sectional view of a second embodiment of a radial-axial ball bearing having unequal contact angles;

FIG. 5 is a sectional view of an adjustable spherical or barrel-shaped bearing;

FIG. 6a is a sectional view of a radial-axial tunnel or barrel-shaped bearing;

FIG. 6b is a detail showing the mounting of two radial-axial tunnel or barrel-shaped bearings;

FIG. 7 is a sectional view of an oscillating spherical bearing with a double line of adjustable barrel-shaped rollers;

FIG. 8a is a sectional view of a first embodiment of an adjustable biconical bearing;

FIG. 8b is a sectional detail of two mounted biconical adjustable bearings, as in FIG. 8a;

FIG. 9a is a sectional view of a second embodiment of an adjustable biconical bearing;

FIG. 9b is a sectional detail of two mounted biconical adjustable bearings, as in FIG. 9a;

FIG. 9c is a detail of a contact line of a biconical adjustable bearing, as in FIG. 9a;

FIG. 10a is a sectional view of a double biconical bearing; and

Figure 10B:
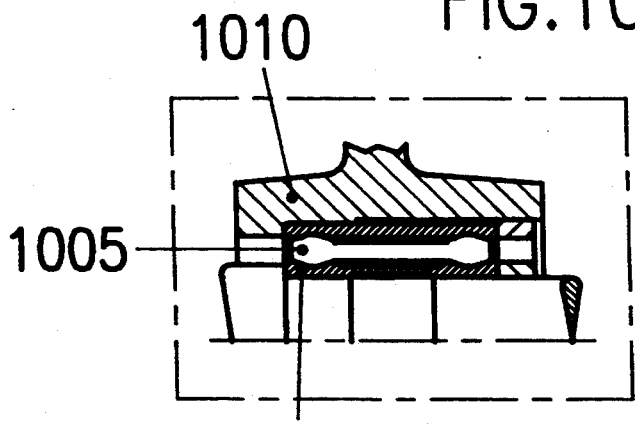

FIG. 10b is a detail of a mounted double biconical bearing, as in FIG. 10a.

DETAILED DESCRIPTION OF THE DRAWING

FIGS. 1 to 10 clearly show where the contact points are situated, and combining their bearing points we achieve reduced or minimized friction. As shown in FIGS. 1–10 and discussed below, the inner bearing race or ring has at least one and preferably two externally facing bearing tracks, each described as an "external track." Similarly, the outer bearing race or ring has either one or two internally-facing bearing tracks, each described as an "internal track."

To open or close the contact points of the heights of spherical or semispherical bearings in FIGS. 5, 6 and 7 the radii of the arcs of contact of heights 1 and 1' of FIG. 5 and the contact heights 2 and 2' of FIG. 6 must be reduced or increased, and also the double contact heights 1 and 1' in FIG. 7.

To open or close the contact points of the heights of the conical roller bearings, the degrees of inclination of the bearing tracks of heights 1 and 1' in FIG. 8 must be increased or decreased, as must also be done with the heights 1 and 1' in FIG. 9. In the double biconical bearing track for conical bearings (FIG. 10) the angles of the contact tracks of height 1 and 1' double must be increased or reduced.

If one begins with 5% friction on each side of the contact points a contact line is formed, thus obtaining highly satisfactory results.

For less developed bearings, if one starts with the idea of reducing friction by 50% lower angles of support or attack can be obtained giving greater rigidity to the bearing.

The said contact points continuously give rise to problems and at the same time destroy the bearing since two points are involved. By transforming these points into contact lines, there will be three or four contact lines instead of two as usually occurs in conventional bail bearings.

If we compare what arises with two points of contact on a ball, with three or four contact lines on a length of approximately one and a half millimeters multiplied by three or four, this gives a contact length of four and a half millimeters to six millimeters, and comparing this with two contact points the high output that this transformation gives is extremely surprising.

Thus the balls will behave as if they were rollers which means that, aside from the great advantages cited above, there is enormous smoothness in the bearing and a very high percentage of disagreeable noise also disappears.

FIG. 1 shows a ball bearing 100 of the rigid type of international series 6200, with measurements or characteristics similar to bearing 6210.

In the upper part is a height marked with thick lines numbered 1 with the letters A and B, the height of the letter A is that of contact and those at B are the damping.

The diameter of the contact point of the ball 105 in its internal bearing track 110 height 1 is 82.80 mm and the diameter of the ball 105 in the same contact point is 12.70 mm; the ratio between both diameters is 6.520. In the lower part of the drawing are two heights 2 and 2' with their corresponding letters A and B.

The diameter of the point of contact of the ball 105 in its external track 120 heights 2 and 2' is 60.80 mm and the diameter of the ball at the point of contact is 9.326 mm, with the ratio between both diameters is 6.520.

It is sufficiently clear that when placing the contact heights in the places that correspond to the measurements of the diameters found, reduced or minimized friction is obtained.

Given below is an example of the friction caused by a ball bearing such as N° 6210:

| | | |
|---|---|---|
| Approximate diameter of the bearing track at the contact point | 82.80 | |
| | | Ratio = 6.520 |
| ball diameter | 12.70 | |
| approximate diameter of the external track of the point of contact | 57.40 | |
| | | Ratio = 4.520 |
| diameter of the ball contact point | 12.70 | |
| | | 2.000 |

The difference between the two ratios is 2.00 which means 44% friction.

Tang into account the 44% friction arising in a normal bearing, 5% friction can be taken at each side of the contact and a contact line obtained instead of a point, which will give highly satisfactory results.

The characteristics of the case illustrated in FIG. 2 are different from those of FIG. 1, since this is an adjustable bearing 200 very useful for large and medium sizes, correcting wear so as to prolong the life of the bearing.

The so-called contact points are converted into lines which highly favours the output of the bearing, prolonging its life many times since it supports a much greater load. It must also be remembered that by removing friction wear is much less and results are highly satisfactory.

With regard to the shapes and sizes of the contact lines of the balls, there are many forms, for example concave, convex, more or less truncated pyramid, etc., with the most appropriate applied in each case.

For greater clarity, the drawing in FIG. 2 shows four contact lines in the lower part.

However, balls of great geometric quality must always be used.

The diameter of the point of contact of the ball 205 in its internal track 210 heights 2 and 2' is 82.50 mm and the diameter of the ball 205 at the same external point of the track 210 is 12.30 mm, with the ratio between both diameters being 6.708.

The diameter of the point of contact of the ball in its external track is 60.80 mm and the diameter of the ball 205 in the same external point of the track 220 at heights 1 and 1' is 60.80 mm, and the diameter of the ball 205 in the same external point of the track 220 is 9.064 mm. The ratio between both diameters is 6.708 thus obtaining reduced or minimized friction.

FIG. 3 corresponds to a radial-axial bearing 300. It has the same concept as those in FIGS. 1 and 2 above since friction is eliminated and more output achieved at the same time. It is differentiated from the others because, since it is radial-axial it has unequal contact angles.

The central internal diameter of the point of contact of the bearing track 310 on the internal part height 1 is 79.80 mm and the diameter of the ball 305 at the same contact point is 12.70 mm, with the ratio between both diameters being 6.284.

The diameter of the point of contact of the ball 305 in its external track 320 height 2 letter A is 57.40 mm and at that same point of contact the diameter of the ball is 9.135 mm, and the ratio that exists between both is also 6.284, achieving reduced or minimize friction with the position of these contacts.

The diameter of the point of contact of the ball 305 in its external track 310 height 2' is 66.42 mm as in the zone mentioned above and in this point of contact the ball 305 has a diameter of 10.57 and thus the ratio between the two diameters is a total of 6.284 with the same ratio and objectivity as previously.

The contact points of the bearings, whether ball, conical rollers, spherical or "tunnel" can be extended in both directions, forming contact lines as wide as necessary for each case.

FIG. 4 shows a radial-axial bearing 400 similar to that in FIG. 3 according to the drawing (FIG. 4). It has two contact points or lines on the internal track 410 in the zones 2 and 2' and its contact angles are more unequal than in the bearing in FIG. 3, however this is unimportant for obtaining reduced or minimized friction.

Since there are four contact points more smoothness and output are imparted to the bearing.

The internal diameter of the contact point of the ball 405 in its track 410 height 2 is 81.20 mm and the diameter of the ball in its contact point is 12.3 mm, with a ratio between the two of 6.602.

In the opposite direction the contact point or line is found for the ball 405 in the external track 420 height 1' where the diameter is 67 mm and as in all previous contacts the ball 405 has a diameter of 10.15 mm at its contact with the track 420, giving a ratio between them of 6.601 and this ratio is equal to the opposite one.

The diameter of the point of contact of the ball 405 in its internal track 410 height 2' is 76.30 mm and the diameter of the ball 405 with the internal track 410 contact in the same point of zone 2' is 11.555 mm, giving a ratio between them of 6.603.

The point of contact of the ball 405 in its external track 420 height 1 is 57.5 mm and the diameter of the ball 405 with the same point of contact in the external track 420 of height 1 is 8.71 mm, with the latter ratio between them being 6.602.

With these contact positions reduced or minimized friction is obtained at the four points.

FIG. 5 shows an adjustable spherical bearing 500 for medium and large sizes which is very easy to adjust for recovery.

As in all the previous bearings, the contact points are situated so that reduced or minimized friction is obtained. The contact points are mentioned frequently but it must not be forgotten that it is very important that the contact points be transformed into lines, since this is fundamental in order to achieve important results without low friction indices.

In this bearing we shall show only two contact points since the four are equidistant.

The diameter of the contact point of the roller 505 in its internal track 510 heights 2 and 2' is 84 mm.

The external diameter of the roller 505 in its spherical part on the internal contact point heights 2 and 2' is 14 mm and therefore the ratio between them is 6.

The diameters of the contact points of the roller 505 in its external track 520 heights 1 and 1' is 100 mm. Therefore the ratios between each other are the same in the four contact points, i.e. 6, obtaining reduced or minimized friction as in previous bearings.

In this type of spherical bearing the contact lines may be wider than in any of the others mentioned above and thus with a very small percentage of friction.

The radial-axial tunnel bearing 600 appearing in FIG. 6, in spite of having unequal contact angles, has very wide contact lines with little friction, giving great solidity, and this type of bearing is also adjustable.

Although the principle for all the bearings is to achieve reduced or minimized friction, it is also very important to maintain perfect balance in the contact points, particularly when the contact lines are widened.

The diameter of the point of contact of the roller 605 in its internal track 610 height 1 letter A is 81 mm and the external diameter of the roller 605 at this same contact point is 12 mm, with a ratio between the two of 6.750.

The diameter of the contact point of the roller 605 in its external track 620 height 2' letter A is 58.30 mm, with the diameter of the roller 605 at this same point being 8.638 mm. In this way the ratio between the mentioned diameters is 6.750.

The contact point of the roller 605 in its external track 620 height 2 is 66.15 mm. The diameter of the external point of contact of the roller 605 at height 2' is 9.8 mm and naturally the ratio is the same, i.e. 6.750 and thus friction is overcome.

FIG. 7 shows an oscillating spherical bearing 700 with a double line of adjustable rollers 705, very useful for large sizes.

The contact points or lines are situated in such a way as to have the same ratios between them in spite of having unequal contact angles, and thus there is perfect equilibrium as detailed below:

The diameter of the contact point of the internal roller tracks 710 at heights 2 and 2' is 80.667 mm, where the diameter of the roller 705 at that same contact point at height 2 letter A is 12 mm. The ratio existing between these two diameters is 6.722.

The diameter of the contact point of the roller 705 in its external track 720 height 1' letter A is 56.667 mm, with the diameter of the semispherical roller 705 at that same point being 8.43 mm, and the ratio between both diameters is 6.722.

Lastly, the diameter of the contact point of the roller 705 in its external track 720 at height 1 letter A is 63.417 mm. The diameters of the contact points of the roller in its external track 720 heights 1 and 1' is 9.434 mm, and the ratio between these six contact points is 6.723 and no friction exists.

Shown in FIG. 8 is a biconical adjustable bearing 800. This bearing 800 is very special since it is outside all the rules and standards for conical bearings up to now. In principle it has no frontal or axial friction as do present conical bearings that when this friction is added to the friction of the rollers, generate enormous heat which limits revolutions and at the same time consumes a great deal of energy, something which does not occur with the new adjustable biconical bearing (FIG. 8) when reduced or minimized friction is achieved from the placement of contacts between the rollers and bearing tracks.

From all that given above, the contact points must he increased between rollers and tracks in order not to lose the fundamental characteristics which are the great load and resistance to which they are subjected, even through a certain percentage of friction is sacrificed.

For normal working they should he mounted in pairs. The diameters of the rollers in their bearing tracks to achieve reduced or minimized friction, are given below:

The diameters of the roller 805 contacts in their internal track 810 height 2 and 2' are 81.25 mm. The diameters of the conical roller 805 at the same contact point of heights 2 and 2' are 11.5 mm, and the ratio between them 7.066.

The diameters of the contact points of the roller 805 in the external track 820 height 1 and 1' are 61.25 mm.

The diameters of the contact points of the roller 805 in the external track 820 at heights 1 and 1' are 8.669 mm, and the ratio between them 7.066, giving reduced or minimized friction.

This adjustable biconical bearing 900 (FIG. 9) is similar to that of FIG. 8, varying only in that the conical rollers 905 are set into the external track 920 of the interior part of the bearing.

In the plan shown in FIG. 9 as a whole, there is a square with different forms of contacts, where the most usual have been drawn although there are very many more and the most useful will be used in each case.

The diameters of the contact points of the roller 905 in the internal track 910 heights 2 and 2' are 87.334 mm. The external diameter of the conical roller 905 at the contact point with the track 910 at heights 2 and 2' is 14.67 mm and the ratio between both diameters is 5.955.

The diameters of the roller 905 contact points in the external track 920 heights 1 and 1' are 62.167.

The external diameters of the conical rollers 905 at the point of contact with the track 920 at heights 1 and 1' are 10.44 mm, with a ratio between both of 5.955.

The points of contact of the rollers with their corresponding bearing tracks at heights 1 and 1', and 2 and 2' are equivalent to each other and therefore only two measurements of their corresponding diameters have been detailed.

Lastly, in FIG. 10 is shown a double biconical bearing 1000 almost exactly like those in FIGS. 8 and 9. Its main characteristic is that the conical rollers 1006 are joined in one piece, giving them more stability and rigidity, and thus forming a single roller 1005.

They are used preferably in places with low revolutions.

As in all the above, the contact points are situated so that friction is reduced or minimized. Since all the contact points are equivalent to each other only two opposite contact points will be mentioned.

The diameter of one of the four internal contact points in the track 1010 at the double heights 2 and 2' is 79.40 mm.

The diameter of the contact point of the biconical roller 1005 in its track 1010 at heights double 2 and 2' is 12.40 mm, with the ratio between both diameters being 6.404.

The diameter of one of the four external points of contact of the tracks 1020 at heights 1 and 1' double is 58 mm.

The diameter of the contact points of the biconical roller 1005 in its bearing track 1020 at heights 1 and 1' double is 9.06 mm giving a ratio between these diameters of 6.402. From all these results, the resulting friction will be reduced or minimized.

Although only preferred embodiments are specifically illustrated and described herein, it will appreciated that many modifications and variations of the present invention are possible in light of the above teachings and within the purview of the appended claims without departing from the spirit and intended scope of the invention.

What is claimed:

1. A bearing having reduced friction, comprising: plurality of rollers,
   an inner track having at least one line of contact with each said roller, said line of contact raised above said inner track,
   said inner track line of contact located at a diametral position having a diametral dimension,
   an outer track having at least one line of contact with each said roller, said outer track line of contact raised above said outer track,
   said outer track line of contact located at a diametral position having a diametral dimension,
   each said roller having a first diametral dimension corresponding to the location of said inner track line of contact and a second diametral dimension corresponding to the location of said outer track line of contact,
   said first line of contact diametral dimension and said first roller diametral dimension forming a ratio approximately equal to a ratio of said second line of contact diametral dimension to said second roller diametral dimension, whereby said lines of contact and said ratios result in reduced friction.

2. A bearing as in claim 1, wherein there are provided four lines of contact in said bearing tracks.

3. A bearing as in claim 1, wherein there are provided four lines of contact in said bearing tracks.

4. A bearing as in claim 1, wherein each said roller is spherical.

5. A bearing as in claim 1, wherein each said roller is biconical.

6. A bearing as in claim 1, wherein each said roller is barrel-shaped.

7. A bearing as in claim 1, wherein said inner track line of contact is of a shape selected from the group of shapes consisting of concave, convex and truncated pyramid.

8. A bearing as in claim 1, wherein said inner track includes a groove formed therein and wherein said outer track includes a groove formed therein, and wherein each said inner track has a line of contact provided on each side of said groove, each said outer track has a line of contact provided on each side of said groove.

9. A bearing as in claim 8, wherein said grooves define a line of symmetry and wherein a pair of lines of contact are provided on said inner track, symmetrically arranged about said line of symmetry, and a pair of lines of contact are provided on said outer track, symmetrically arranged about said line of symmetry.

10. A bearing as in claim 1, wherein two symmetrically arranged lines of contact are provided on each of said inner track and said outer track.

11. A bearing as in claim 1, wherein said inner and outer tracks are oriented so as to form a diagonal line of symmetry and wherein a pair of lines of contact are provided on said inner track, symmetrically arranged about said line of symmetry, and a line of contact provided on said outer track, located on said line of symmetry.

12. A bearing as in claim 1, wherein said inner and outer tracks are oriented so as to form a diagonal line of symmetry and wherein a pair of lines of contact are provided on said inner track, symmetrically arranged about said line of symmetry, and a pair of lines of contact are provided on said outer track, symmetrically arranged about said line of symmetry.

13. A bearing as in claim 1, wherein said outer track is provided with a groove therein defining a line of symmetry and a pair of lines of contact arranged symmetrically about said line of symmetry and said inner track is provided with a pair of lines of contact arranged symmetrically about said line of symmetry.

14. A bearing as in claim 1, wherein said outer track is provided with a groove therein so as to define a line of symmetry, wherein a pair of rollers are provided disposed between said inner and outer tracks symmetrically about said line of symmetry, wherein for each said roller, a pair of lines of contact are provided on said inner track and a line of contact is provided on said outer track, said lines of contact on said inner track symmetrically arranged about said line of symmetry and said lines of contact on said outer track symmetrically arranged about said line of symmetry.

15. A bearing as in claim 14, wherein said rollers are barrel shaped.

16. A bearing as in claim 1, wherein said roller comprises a pair of longitudinally connected biconical shaped ends, said roller symmetrically arranged about a line of symmetry and wherein, for each biconical end, a pair of lines of contact are provided in said inner track and a pair of lines of contact are provided in said outer track, said lines of contact arranged symmetrically about said line of symmetry.

17. A bearing as in claim 1, wherein said outer track line of contact is of a shape selected from the group of shapes consisting of concave, convex and truncated pyramid.

18. A bearing having reduced friction, comprising:
   a plurality of rollers,
   an inner track having at least one line of contact with each said roller, said line of contact raised above said inner track and contoured to conform to said rollers,
   said inner track line of contact located at a diametral position having a diametral dimension,
   an outer track having at least one line of contact with each said roller, said outer track line of contract raised above said outer track and contoured to conform to said rollers,
   said outer track line of contact located at a diametral position having a diametral dimension,
   each said roller having a first diametral dimension corresponding to the location of said inner track line of contact and a second diametral dimension corresponding to the location of said outer track line of contact, said first line of contact diametral dimension and said first roller diametral dimension forming a ratio approximately equal to a ratio of said second line of contact diametral dimension to said second roller diametral dimension, whereby said lines of contact and said ratios result in reduced friction.

19. A bearing having reduced friction, comprising:

a plurality of rollers, an inner track having two lines of contact with each said roller, said lines of contact raised above said inner track and contoured to conform to said rollers, said inner track lines of contact located at a diametral position having a diametral dimension, an outer track having at least one line of contact with each said roller, said at least one outer track line of contract raised above said outer track and contoured to conform to said rollers, said outer track line of contact located at a diametral position having a diametral dimension, each said roller having a first diametral dimension corresponding to the location of said inner track lines of contact and a second diametral dimension corresponding to the location of said outer track line of contact, said first line of contact diametral dimension and said first roller diametral dimension forming a ratio approximately equal to a ratio of said second line of contact diametral dimension to said second roller diametral dimension, whereby said lines of contact and said ratios result in reduced friction.

20. A bearing as in claim 19, further comprising an outer track having two lines of contact.

* * * * *